United States Patent
Sato

(10) Patent No.: US 9,979,226 B2
(45) Date of Patent: May 22, 2018

(54) SOLAR BATTERY CONTROLLER

(71) Applicant: TOYOTA JIDOSHA KABUSHIKI KAISHA, Toyota-shi (JP)

(72) Inventor: Daisuke Sato, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 67 days.

(21) Appl. No.: 15/034,396

(22) PCT Filed: Nov. 6, 2014

(86) PCT No.: PCT/IB2014/002349
§ 371 (c)(1),
(2) Date: May 4, 2016

(87) PCT Pub. No.: WO2015/068021
PCT Pub. Date: May 14, 2015

(65) Prior Publication Data
US 2016/0301246 A1 Oct. 13, 2016

(30) Foreign Application Priority Data

Nov. 6, 2013 (JP) ................................ 2013-230667

(51) Int. Cl.
*H02J 7/00* (2006.01)
*H02J 7/35* (2006.01)
(Continued)

(52) U.S. Cl.
CPC ................. *H02J 7/35* (2013.01); *G05F 1/67* (2013.01); *H02J 3/385* (2013.01); *H02S 40/36* (2014.12);
(Continued)

(58) Field of Classification Search
CPC ................. G05F 1/97; H02J 3/385; H02J 7/35
(Continued)

(56) References Cited

U.S. PATENT DOCUMENTS

2011/0073150 A1* 3/2011 Hightower ................ G05F 1/67
136/244
2013/0140911 A1 6/2013 Hightower et al.

FOREIGN PATENT DOCUMENTS

JP 8-123563 A 5/1996
JP 2009-170640 A 7/2009
(Continued)

OTHER PUBLICATIONS

International Search Report dated Feb. 4, 2015 in PCT/IB2014/002349 filed Nov. 6, 2014.
(Continued)

*Primary Examiner* — Nathaniel Pelton
(74) *Attorney, Agent, or Firm* — Oblon, McClelland, Maier & Neustadt, L.L.P.

(57) ABSTRACT

A solar battery controller includes: a solar battery module including a plurality of solar battery clusters and a bypass portion, the plurality of solar battery clusters being arranged side by side in a direction that intersects with a traveling direction of a moving object, the plurality of solar battery clusters being connected in series, the bypass portion being configured to bypass the solar battery cluster to which a light intensity applied has decreased; a light intensity detecting unit configured to detect a light intensity that is applied to a corresponding one of the solar battery clusters, the light intensity detecting unit being arranged ahead of the corresponding one of the solar battery clusters in the traveling direction of the moving object; and a control unit configured to determine a maximum power point of the solar battery module.

10 Claims, 14 Drawing Sheets

(51) Int. Cl.
  *G05F 1/67* (2006.01)
  *H02S 50/00* (2014.01)
  *H02S 40/36* (2014.01)
  *H02J 3/38* (2006.01)

(52) U.S. Cl.
  CPC ............ *H02S 50/00* (2013.01); *Y02E 10/566* (2013.01); *Y02E 10/58* (2013.01)

(58) Field of Classification Search
  USPC ........................................................ 320/101
  See application file for complete search history.

(56) References Cited

FOREIGN PATENT DOCUMENTS

| | | |
|---|---|---|
| JP | 2010-199359 A | 9/2010 |
| JP | 2011-186583 A | 9/2011 |
| JP | 2012-69922 A | 4/2012 |
| WO | 2012/063304 A1 | 5/2012 |

OTHER PUBLICATIONS

Partial English Translation of Office Action dated Oct. 27, 2015 in JP Application 2013-230667 filed Nov. 6, 2013.

\* cited by examiner

SOLAR BATTERY CONTROLLER

BACKGROUND OF THE INVENTION

1. Field of the Invention

The invention relates to a solar battery controller.

2. Description of Related Art

There is known a solar battery controller including a solar battery module of which an output voltage is increased by connecting a plurality of solar battery cells in series. In such a solar battery controller, when a light intensity applied to part of the solar battery cells of the solar battery module decreases because of the influence of a shadow, or the like, the part of the solar battery cells, to which the decreased light intensity is applied, can supply a decreased current. Therefore, a current flowing through the other solar battery cells also decreases to the current that the part of the solar battery cells to which the decreased light intensity is applied can pass, with the result that the amount of electric power generated by the overall solar battery module decreases. Therefore, by bypassing the solar battery cells decreased in power generation capacity, the amount of electric power generated by the overall solar battery module is kept high.

A maximum output point of the solar battery module fluctuates depending on a weather condition, or the like, so control called maximum power point tracking (MPPT) for maximizing electric power generated by the solar battery module is executed. In MPPT, for example, the maximum output point of a P-V characteristic curve (power-voltage characteristic curve) is searched for by hill-climbing method. In MPPT, usually, it takes a time of about several seconds to several tens of seconds to obtain the maximum output point.

Incidentally, when the solar battery module is installed on a moving object, the amount of solar radiation varies in a short cycle (for example, about several tens of milliseconds) because of movement of the moving object. When the P-V characteristic curve significantly fluctuates as a result of bypassing the solar battery cells decreased in power generation capacity as described above, there is a possibility that it takes time more than usual to obtain the maximum output point in MPPT or the maximum output point cannot be found.

That is, when the solar battery module is installed on the moving object, it is not possible to track a variation in the amount of solar radiation in a short cycle even with a combination of the MPPT with the method of bypassing the solar battery cells decreased in power generation capacity. As a result, the amount of electric power generated by the solar battery module may remarkably decrease while the moving object is moving.

SUMMARY OF THE INVENTION

The invention provides a solar battery controller of which trackability to a maximum output point is improved in the case where the amount of solar radiation to a solar battery module varies.

A solar battery controller includes: a solar battery module including a plurality of solar battery clusters and a bypass portion, the plurality of solar battery clusters being arranged side by side in a direction that intersects with a traveling direction of a moving object, the plurality of solar battery clusters being connected in series, the bypass portion being configured to bypass the solar battery cluster to which a light intensity applied has decreased; a first light intensity detecting unit configured to detect a light intensity that is applied to a corresponding one of the solar battery clusters, the first light intensity detecting unit being arranged ahead of the corresponding one of the solar battery clusters in the traveling direction of the moving object; and a control unit configured to determine a maximum power point of the solar battery module, wherein the control unit is configured to acquire a change in the number of bypassed solar battery clusters based on a change in an output of each first light intensity detecting unit, the control unit is configured to shift a start voltage to a first start voltage corresponding to the changed number of bypassed solar battery clusters, and the control unit is configured to determine the maximum power point of the solar battery module by calculating an electric power while changing a voltage from the first start voltage.

According to the disclosed technique, it is possible to provide a solar battery controller of which trackability to a maximum output point is improved in the case where the amount of solar radiation to a solar battery module varies.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
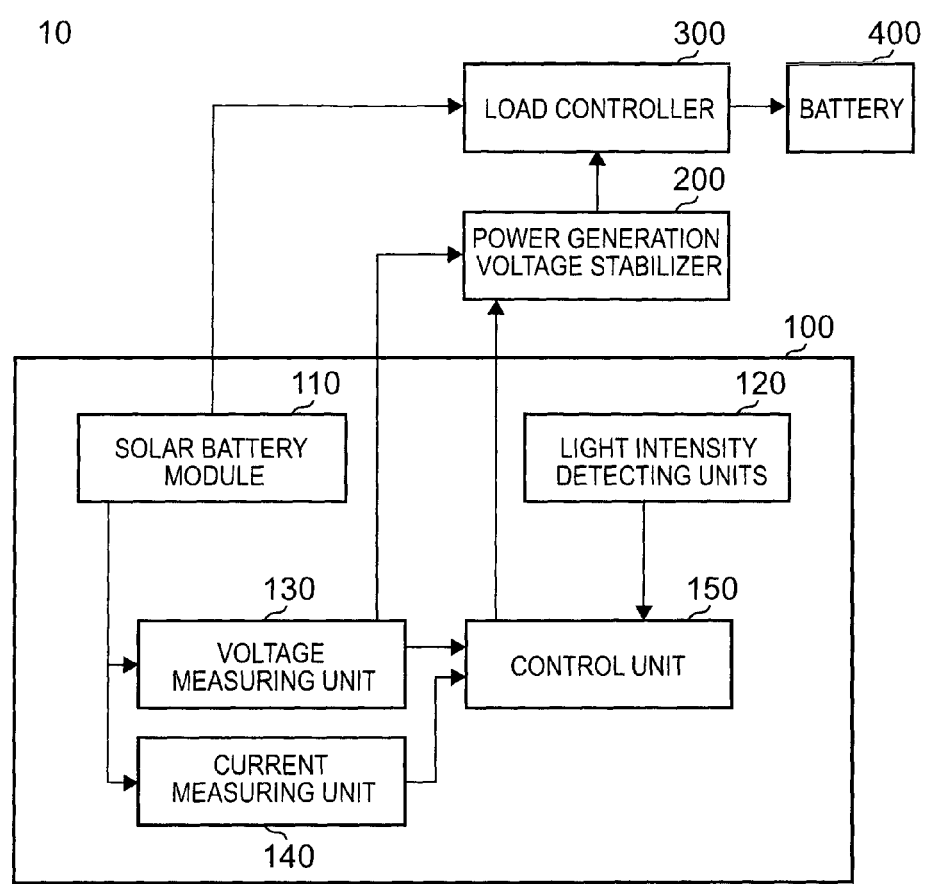
FIG. 1 is a block diagram that illustrates a photovoltaic power generating system according to a first embodiment.

Hereinafter, embodiments of the invention will be described with reference to the accompanying drawings. In the drawings, like reference numerals denote the same components, and the overlap description may be omitted.

First Embodiment

FIG. 1 is a block diagram that illustrates a photovoltaic power generating system according to a first embodiment. As shown in FIG. 1, the photovoltaic power generating system 10 includes a solar battery controller 100, a power generation voltage stabilizer 200 and a load controller 300. The solar battery controller 100 receives sunlight, and generates electric power at a predetermined voltage.

The power generation voltage stabilizer 200 and the load controller 300 control a load of a solar battery module 110 that constitutes the solar battery controller 100. Specifically, the power generation voltage stabilizer 200 adjusts a load of the load controller 300 so that a generated voltage of the solar battery module 110 coincides with the predetermined voltage.

The load controller 300 includes, for example, a step-up circuit or a step-down circuit (DC-DC converter). The load controller 300 has the function of equivalently changing the I-V characteristics (current-voltage characteristics) or P-V characteristics (power-voltage characteristics) of the solar battery module 110. The load controller 300 controls the output voltage of the solar battery module 110 so that electric power generated by the solar battery module 110 becomes maximum. A battery 400 is an object to which electric power is supplied from the solar battery module 110 via the load controller 300. Instead of the battery 400, electric power may be supplied to a capacitor, another device, or the like.

Figure 2:
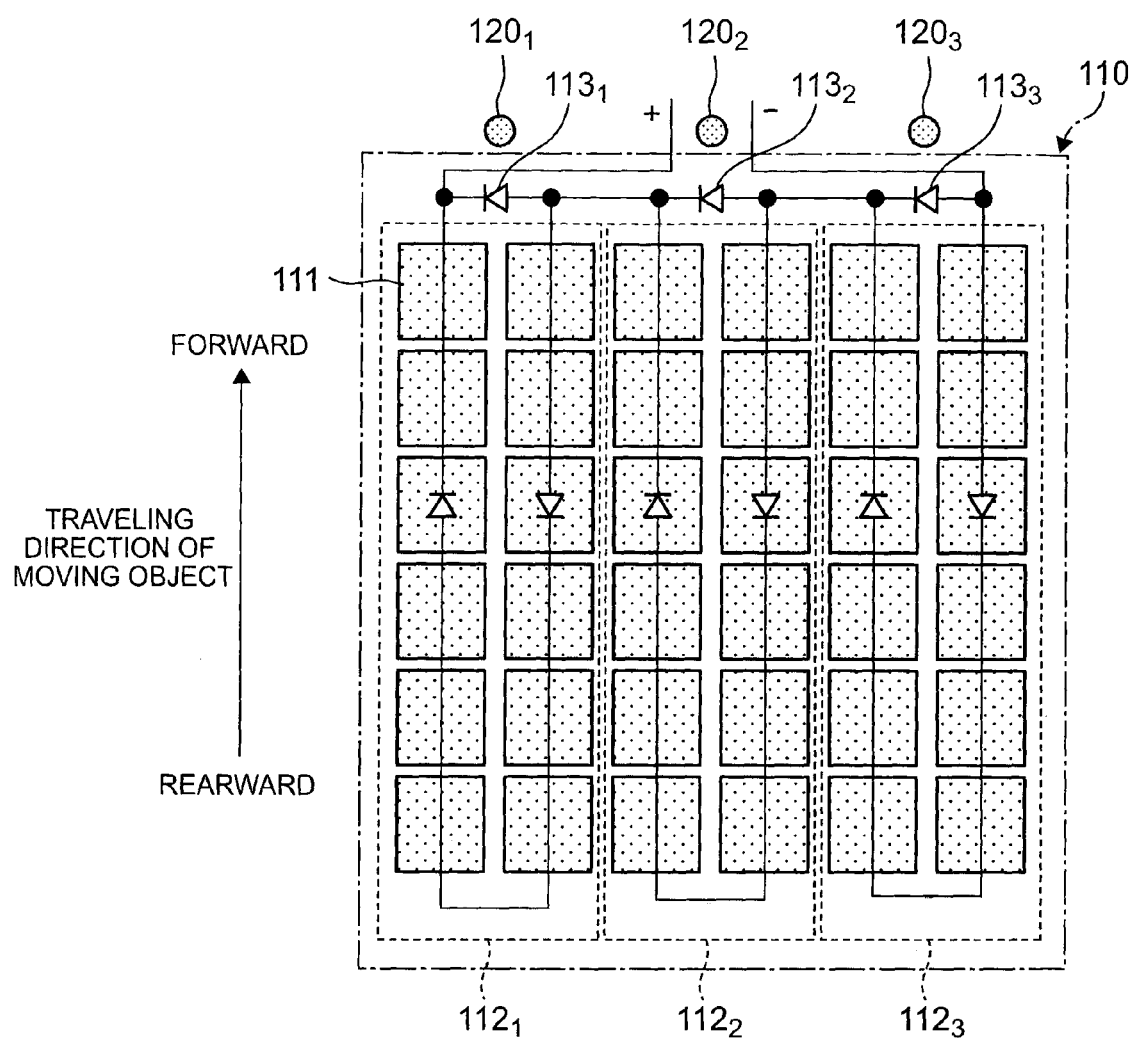
FIG. 2 is a schematic view that illustrates a solar battery module and light intensity detecting units that constitute a solar battery controller according to the first embodiment.

FIG. 2 is a schematic view that illustrates the solar battery module and light intensity detecting units that constitute the solar battery controller according to the first embodiment. The solar battery controller 100 according to the first embodiment will be described with reference to FIG. 1 and FIG. 2. The solar battery controller 100 includes the solar battery module 110, the light intensity detecting units 120, a voltage measuring unit 130, a current measuring unit 140 and a control unit 150.

The solar battery module 110 is installed on a moving object. The solar battery module 110 includes a solar battery cluster $112_1$, a solar battery cluster $112_2$, a solar battery cluster $112_3$, a bypass diode $113_1$, a bypass diode $113_2$ and a bypass diode $113_3$.

The solar battery clusters $112_1$ to $112_3$ are arranged side by side in a direction that intersects with a traveling direction of the moving object (for example, a direction substantially perpendicular to the traveling direction), and are connected in series. Each of the solar battery clusters $112_1$ to $112_3$ is formed of a plurality of solar battery cells 111 connected in series. Each of the solar battery cells 111 may be formed of, for example, a monocrystalline silicon, or the like. However, each of the solar battery cells 111 is not specifically limited to a monocrystalline silicon. When the solar battery clusters $112_1$ to $112_3$ do not need to be particularly distinguished from one another, the solar battery clusters $112_1$ to $112_3$ are referred to as solar battery clusters 112.

In the present embodiment, the case where the three solar battery clusters 112 are connected in series will be described by way of example. However, the solar battery module 110 just needs to include two or more solar battery clusters 112 connected in series. Each of the solar battery clusters 112 just needs to include one or more solar battery cells 111. In the present embodiment, the following description will be described by taking an automobile as an example of the moving object. However, the moving object is not limited to an automobile, and may be, for example, a motorcycle, an electric train, or the like.

The bypass diode $113_1$ is connected in parallel with the solar battery cluster $112_1$. Similarly, the bypass diode $113_2$ is connected in parallel with the solar battery cluster $112_2$, and the bypass diode $113_3$ is connected in parallel with the solar battery cluster $112_3$. When the bypass diodes $113_1$ to $113_3$ do not need to be particularly distinguished from one another, the bypass diodes $113_1$ to $113_3$ are referred to as bypass diodes 113.

The bypass diodes 113 constitute a bypass portion bypasses the solar battery cluster 112 to which a light intensity applied has decreased. For example, when the output of a corresponding one of the solar battery clusters 112 has decreased because of the influence of a shadow, or the like, each of the bypass diodes 113 bypass the corresponding one of the solar battery clusters 112, of which the output has decreased. By providing the bypass diodes 113 and bypassing the corresponding one of the solar battery clusters 112, of which the output has decreased, it is possible to minimize a decrease in the overall output of the solar battery module 110.

The light intensity detecting unit $120_1$ is arranged ahead of the solar battery cluster $112_1$ in the traveling direction of the moving object. Similarly, the light intensity detecting unit $120_2$ is arranged ahead of the solar battery cluster $112_2$ in the traveling direction of the moving object, and the light intensity detecting unit $120_3$ is arranged ahead of the solar battery cluster $112_3$ in the traveling direction of the moving object. For example, a photodiode, a phototransistor, or the like, may be used as each of the light intensity detecting units $120_1$ to $120_3$. A charge coupled device (CCD) or a solar battery cell (a small piece of solar battery cell) may be used as each of the light intensity detecting units $120_1$ to $120_3$. When the light intensity detecting units $120_1$ to $120_3$ do not particularly need to be distinguished from one another, the light intensity detecting units $120_1$ to $120_3$ may be termed light intensity detecting units 120.

By respectively arranging the light intensity detecting units 120 ahead of the corresponding solar battery clusters 112 in the traveling direction of the moving object, it is possible to detect the light intensity that is applied to each of the solar battery clusters 112. Specifically, it is possible to detect entry of a shadow in the traveling direction of the moving object. The shadow shades part of the solar battery clusters 112. The light intensities detected by the light intensity detecting units 120 are transmitted to the control unit 150.

The voltage measuring unit 130 has the function of measuring a voltage generated by the solar battery module 110. For example, a combination of a resistance type potential divider and an AD converter connected in parallel with the solar battery module 110 may be used as the voltage measuring unit 130. The voltage measured by the voltage measuring unit 130 is transmitted to the control unit 150.

The current measuring unit 140 has the function of measuring a current generated by the solar battery module 110. For example, a combination of a shunt resistor and an AD converter connected in series with the solar battery module 110 or a current probe may be used as the current measuring unit 140. The current measured by the current measuring unit 140 is transmitted to the control unit 150.

The control unit 150 has, for example, the function of determining the maximum power point (MPP) of the solar battery module 110 based on information about the light intensities detected by the light intensity detecting units 120, the voltage measured by the voltage measuring unit 130, the current measured by the current measuring unit 140, and the like.

The control unit 150 includes, for example, a CPU, a ROM, a main memory, and the like. Various functions of the control unit 150 are implemented by the CPU loading programs stored in the ROM, or the like, onto the main memory and executing the loaded programs. However, part or all of the control unit 150 may be implemented by hardware only. Alternatively, the control unit 150 may be physically formed of a plurality of devices.

Next, the influence of a shadow on the solar battery module 110 will be described. Because the solar battery controller 100 is installed on the moving object, the solar battery controller 100 is influenced by a shading object during movement. When the moving object is an automobile, the shading object may be, for example, a traffic sign, a utility pole, a pedestrian crossover bridge, a street tree, another large-sized automobile, or the like.

Figure 3A:
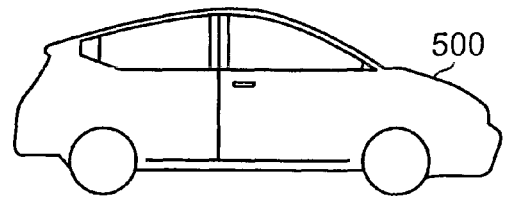
FIG. 3A is a view that illustrates a manner in which a shadow passes over an automobile.
Figure 3B:
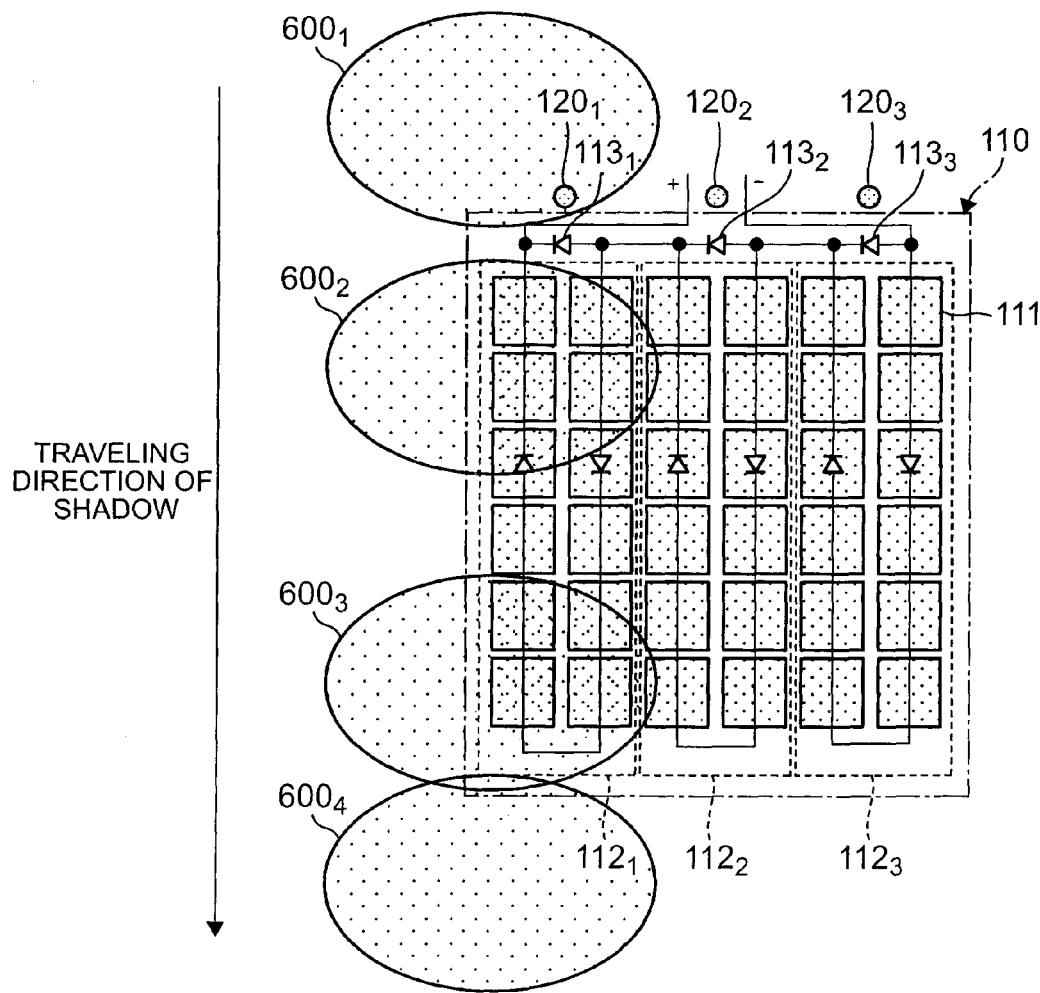
FIG. 3B is a view that illustrates a manner in which a shadow passes over part of the solar battery module installed on the automobile.

FIG. 3A and FIG. 3B illustrate a manner in which a shadow passes over part of the solar battery module 110 of the solar battery controller 100 installed in an automobile 500. In the examples of FIG. 3A and FIG. 3B, a shadow passes over the solar battery cluster $112_1$ of the solar battery module 110. That is, as the automobile 500 travels, the shadow travels in order of $600_1$, $600_2$, $600_3$ and $600_4$, and shades the solar battery cluster $112_1$.

Figure 4:
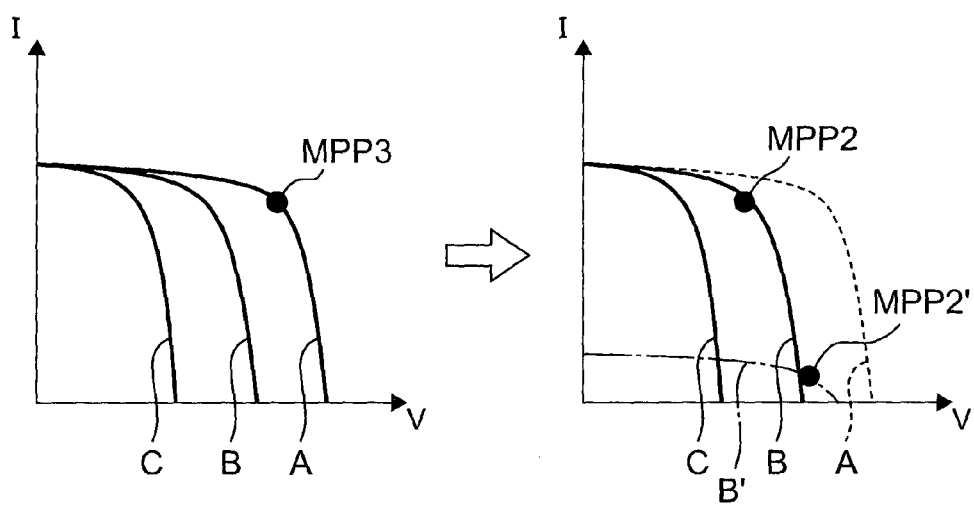
FIG. 4 is a view that illustrates an I-V characteristic curve of the solar battery module.

FIG. 4 illustrates the I-V characteristic curve of the solar battery module 110. "A" indicates an example of the characteristics in the case where all the three solar battery clusters $112_1$ to $112_3$ are not shaded. "B" indicates an example of the characteristics in the case where any one of the three solar battery clusters $112_1$ to $112_3$ is shaded (bypassed). "C" indicates an example of the characteristics in the case where any two of the three solar battery clusters $112_1$ to $112_3$ are shaded (bypassed).

In FIG. 4, MPP3 indicates the maximum power point in the case where the number of effective solar battery clusters 112 is three (in the case where all the solar battery clusters 112 are not bypassed). MPP2 indicates the maximum power point in the case where the number of effective solar battery clusters 112 is two (in the case where one of the solar battery clusters 112 is bypassed and the other two solar battery clusters 112 are not bypassed).

When the solar battery cluster $112_1$ is shaded as shown in FIG. 3B, the bypass diode $113_1$ is brought into conduction to bypass the solar battery cluster $112_1$. As a result, the I-V characteristic curve of FIG. 4 shifts from the curve indicated by A to the curve indicated by B. In this case, the light intensity detecting unit $120_1$ detects a reduction in light intensity that is applied to the solar battery cluster $112_1$. Because the detected result is transmitted to the control unit 150, the control unit 150 can learn the fact that the solar battery cluster $112_1$ is bypassed.

If no bypass diode $113_1$ is provided, the I-V characteristic curve shifts from the curve indicated by A to the curve indicated by B', and the maximum power point is MPP2', so a large decrease in the amount of generated electric power occurs in the overall solar battery module 110. In other words, because the bypass diode $113_1$ is provided in the solar battery cluster $112_1$ in the solar battery module 110, even when the solar battery cluster $112_1$ is shaded, the bypass diode $113_1$ is brought into conduction to bypass the solar battery cluster $112_1$. Therefore, the I-V characteristic curve shifts from the curve indicated by A to the curve indicated by B and does not shift from the curve indicated by A to the curve indicated by B'. As a result, it is possible to avoid a large decrease in the amount of generated electric power (decrease in efficiency) in the overall solar battery module 110.

The bypass diode 113 is provided for each of the solar battery clusters 112. Therefore, even when another one of the solar battery clusters 112 is shaded, the corresponding bypass diode 113 is brought into conduction to bypass the (shaded) solar battery cluster 112 that becomes a factor of a decrease in efficiency, so it is possible to avoid a large decrease in the amount of generated electric power (decrease in efficiency) in the overall solar battery module 110.

Incidentally, in the related art, in order to search for a maximum power point, for example, hill-climbing method that utilizes the P-V characteristic curve is used. In the hill-climbing method, initially, where an operation voltage is $V_0$ and an electric power is $P_0$ at the start timing, the operation voltage is increased by $\Delta V$ to obtain $V_0+\Delta V=V_1$, an electric power $P_1$ at that time is calculated, and the electric power $P_1$ is compared with $P_0$. When $P_1$ is larger than $P_0$, the sign of $\Delta V$ is not changed, the operation voltage is increased by $\Delta V$ to obtain $V_1+\Delta V=V_2$, an electric power $P_2$ at that time is calculated, and the electric power $P_2$ is compared with $P_1$.

This is repeated until $P_n$ becomes smaller than $P_{n-1}$. When $P_n$ becomes smaller than $P_{n-1}$, the sign of $\Delta V$ is inverted to obtain $V_n-\Delta V=V_{n-1}$, and an electric power $P_{n-1}$ at that time is calculated (n is a natural number, the same applies to those in the following description). Thus, because it is found that there is a maximum power point between the operation voltage $V_{n-1}$ and the operation voltage $V_n$, the maximum power point alternates between the operation voltage $V_{n-1}$ and the operation voltage $V_n$ thereafter until a change in the P-V characteristic curve occurs because of, for example, fluctuations in the amount of solar radiation.

However, the hill-climbing method of such an algorithm is not able to instantaneously track a steep change in the P-V characteristic curve. For example, when the maximum power point changes from MPP3 to MPP2 in FIG. 4 because of the influence of a shadow, because MPP2 is searched for while changing the voltage in $\Delta V$ as described above, it takes a time of about several minutes to obtain MPP2.

In the present embodiment, by executing interrupt control, trackability to a maximum output point is improved in the case where the P-V characteristic curve has steeply changed. In this respect, description will be made with reference to FIG. 5 to FIG. 9. The control unit 150 of the solar battery controller 100 is configured to be able to execute a flowchart 1 shown in FIG. 5, a flowchart 2 shown in FIG. 6, a flowchart 3 shown in FIG. 7, a flowchart 4 shown in FIG. 8 and a flowchart 5 shown in FIG. 9.

Initially, the flowchart 1 shown in FIG. 5 will be described. The flowchart 1 is a flowchart in the case where none of the solar battery clusters $112_1$, $112_2$, $112_3$ is shaded (in the case where none of the solar battery clusters $112_1$, $112_2$, $112_3$ is bypassed). The control unit 150 is able to learn from the light intensities respectively detected by the light intensity detecting units $120_1$, $120_2$, $120_3$ that none of the solar battery clusters $112_1$, $112_2$, $112_3$ is shaded (none of the solar battery clusters $112_1$, $112_2$, $112_3$ is bypassed).

In step S11, the control unit 150 sets the start voltage. A substantial value (MPP approximate value) of the maximum power point in the case where the three solar battery clusters are connected in series is determined by design, so that value is set for a voltage $V_{3\_1}$ (start voltage). Subsequently, in step S12, the control unit 150 stores the voltage $V_{3\_1}$ and a current $I_{3\_1}$, and calculates an electric power $P_{3\_1}$. The control unit 150 is able to acquire the value of voltage from the voltage measuring unit 130 and the value of current from the current measuring unit 140 (the same applies to voltage and current in the following description).

The control unit 150 prestores a plurality of start voltages corresponding to the number of non-bypassed solar battery clusters 112. That is, the control unit 150 prestores the start voltage (the above-described voltage $V_{3\_1}$) in the case where none of the solar battery clusters 112 is bypassed, a start voltage (voltage $V_{2\_1}$ (described later)) in the case where any one of the solar battery clusters 112 is shaded, and a start voltage (voltage $V_{1\_1}$ (described later)) in the case where any two of the solar battery clusters 112 are shaded. The control unit 150 prestores n start voltages when the number of the solar battery clusters 112 is n.

Subsequently, in step S13, the control unit 150 stores a voltage $V_{3\_0}$ and a current $I_{3\_0}$ at that time, and calculates an electric power $P_{3\_0}$. The voltage $V_{3\_0}$ is obtained by changing the voltage $V_{3\_1}$ (start voltage) by $-\Delta V$. In addition, the control unit 150 stores a voltage $V_{3\_2}$ and a current $I_{3\_2}$ at that time, and calculates an electric power $P_{3\_2}$. The voltage $V_{3\_2}$ is obtained by changing the voltage $V_{3\_1}$ (start voltage) by $+\Delta V$.

Subsequently, in step S14, the control unit 150 compares the electric power $P_{3\_0}$, the electric power $P_{3\_1}$ and the electric power $P_{3\_2}$ with one another, and selects the maximum value. Subsequently, in step S15, the control unit 150 replaces the value of the electric power $P_{3\_1}$ with the maximum value selected in step S14. After that, by repeatedly executing step S12 to step S15, it is possible to track the maximum power point.

Next, the flowchart 2 shown in FIG. 6 will be described. The flowchart 2 is a flowchart in the case where any one of the solar battery clusters $112_1$, $112_2$, $112_3$ is shaded and bypassed. That is, the flowchart 2 is a flowchart in the case where only the two solar battery clusters are operating. The control unit 150 is able to learn from the light intensities respectively detected by the light intensity detecting units $120_1$, $120_2$, $120_3$ that any one of the solar battery clusters $112_1$, $112_2$, $112_3$ is shaded and bypassed.

In step S21, the control unit 150 sets the start voltage. A substantial value (MPP approximate value) of the maximum power point in the case where the two solar battery clusters are connected in series is determined by design, so that value is set for a voltage $V_{2\_1}$ (start voltage). Subsequently, in step S22, the control unit 150 stores the voltage $V_{2\_1}$ and a current $I_{2\_1}$, and calculates an electric power $P_{2\_1}$.

Subsequently, in step S23, the control unit 150 stores a voltage $V_{2\_0}$ and a current $I_{2\_0}$ at that time, and calculates an electric power $P_{2\_0}$. The voltage $V_{2\_0}$ is obtained by changing the voltage $V_{2\_1}$ (start voltage) by $-\Delta V$. In addition, the control unit 150 stores a voltage $V_{2\_2}$ and a current $I_{2\_2}$ at that time, and calculates an electric power $P_{2\_2}$. The voltage $V_{2\_2}$ is obtained by changing the voltage $V_{2\_1}$ (start voltage) by $+\Delta V$.

Subsequently, in step S24, the control unit 150 compares the electric power $P_{2\_0}$, the electric power $P_{2\_1}$ and the electric power $P_{2\_2}$ with one another, and selects the maximum value. Subsequently, in step S25, the control unit 150 replaces the value of the electric power $P_{2\_1}$ with the maximum value selected in step S24. After that, by repeatedly executing step S22 to step S25, it is possible to track the maximum power point.

Next, the flowchart 3 shown in FIG. 7 will be described. The flowchart 3 is a flowchart in the case where any two of the solar battery clusters $112_1$, $112_2$, $112_3$ are shaded and bypassed. That is, the flowchart 2 is a flowchart in the case where only one solar battery cluster is operating. The control unit 150 is able to learn from the light intensities respectively detected by the light intensity detecting units $120_1$, $120_2$, $120_3$ that any two of the solar battery clusters $112_1$, $112_2$, $112_3$ are shaded and bypassed.

In step S31, the control unit 150 sets the start voltage. A substantial value (MPP approximate value) of the maximum power point in the case of the one solar battery cluster is determined by design, so that value is set for a voltage $V_{1\_1}$ (start voltage). Subsequently, in step S32, the control unit 150 stores the voltage $V_{1\_1}$ and a current $I_{1\_1}$, and calculates an electric power $P_{1\_1}$.

Subsequently, in step S33, the control unit 150 stores a voltage $V_{1\_0}$ and a current $I_{1\_0}$ at that time, and calculates an electric power $P_{1\_0}$. The voltage $V_{1\_0}$ is obtained by changing the voltage $V_{1\_1}$ (start voltage) by $-\Delta V$. In addition, the control unit 150 stores a voltage $V_{1\_2}$ and a current $I_{1\_2}$ at that time, and calculates an electric power $P_{1\_2}$. The voltage $V_{1\_2}$ is obtained by changing the voltage $V_{1\_1}$ (start voltage) by $+\Delta V$.

Subsequently, in step S34, the control unit 150 compares the electric power $P_{1\_0}$, the electric power $P_{1\_1}$ and the electric power $P_{1\_2}$ with one another, and selects the maximum value. Subsequently, in step S35, the control unit 150 replaces the value of the electric power $P_{1\_1}$ with the maximum value selected in step S34. After that, by repeatedly executing step S32 to step S35, it is possible to track the maximum power point.

Next, the flowchart 4 shown in FIG. 8 will be described. The flowchart 4 is a flowchart in the case where all of the solar battery clusters $112_1$, $112_2$, $112_3$ are shaded (in the case where all of the solar battery clusters $112_1$, $112_2$, $112_3$ are bypassed). That is, the flowchart 4 is a flowchart in the case where none of the solar battery clusters is operating. The control unit 150 is able to learn from the light intensities respectively detected by the light intensity detecting units $120_1$, $120_2$, $120_3$ that all of the solar battery clusters $112_1$, $112_2$, $112_3$ are shaded and bypassed.

As shown in FIG. 1, the solar battery controller 100 is configured to be able to connect the load controller 300 to an output unit of the solar battery module 110. The load controller 300 controls the load of the solar battery module 110. In step S41, the control unit 150 outputs a command to set the load controller 300 (see FIG. 1) to an open state (no-load state). Specifically, the control unit 150, for example, outputs a command to set the duty ratio of the step-up circuit or step-down circuit (DC-DC converter) of the load controller 300 to zero percent. Upon reception of the command, the load controller 300 becomes an open state. The command may be, for example, conveyed from the control unit 150 to the load controller 300 via the power generation voltage stabilizer 200.

Next, the flowchart 5 shown in FIG. 9 will be described. The flowchart 5 is a flowchart for interrupt control. The control unit 150 acquires a change in the number of bypassed solar battery clusters 112 based on a change in the outputs of the light intensity detecting units 120, and shifts the start voltage to the start voltage corresponding to the changed number. However, the control unit 150 outputs a command to set the load controller 300 to an open state when the control unit 150 has acquired that all the solar battery clusters 112 are bypassed based on a change in the outputs of the light intensity detecting units 120.

The control unit 150 is able to learn the number of light intensity detecting units 120 of which the output is 1 from the light intensities respectively detected by the light intensity detecting units $120_1$, $120_2$, $120_3$. The output is 1 when not shaded, and the output is 0 when shaded. However, the output value is not limited to these values. Hereinafter, specific steps will be described.

Figure 5:
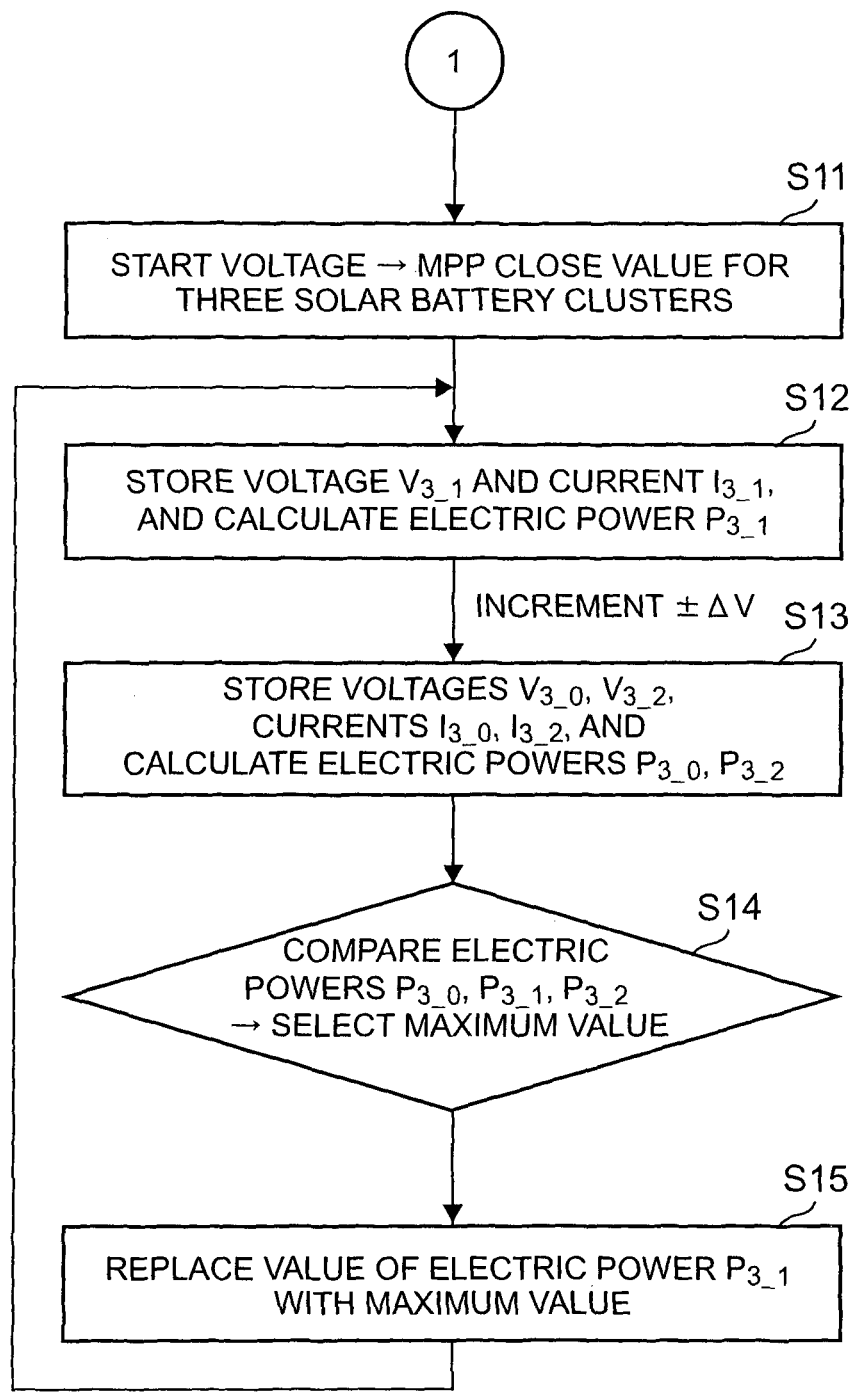
FIG. 5 is an example (part 1) of a flowchart that shows the operation of a control unit.

In step S51, the control unit 150 executes the flowchart 1 shown in FIG. 5. When the output of any one of the light intensity detecting units 120 changes, the change in the output becomes a trigger of interrupt, and the process proceeds to step S81 and step S82. In step S81, the control unit 150 checks the number of light intensity detecting units 120 of which the output is 1. In step S82, the control unit 150 determines whether the amount of change in the number of light intensity detecting units 120 of which the output is 1 is negative.

When it is determined in step S82 that the change in the number of light intensity detecting units 120 of which the output is 1 is negative (in the case of Yes), the process proceeds to step S52. In step S52, the start voltage is shifted to the start voltage corresponding to the number of light intensity detecting units 120 of which the output is 1 (the changed number), and the corresponding flowchart (any one of the flowcharts 1 to 3) is executed. However, when the number of light intensity detecting units 120 of which the output is 1 is zero, the flowchart 4 is executed, and a command to set the load controller 300 to an open state is output.

When the output of any one of the light intensity detecting units 120 changes, the change in the output becomes a trigger of interrupt, and the process proceeds to step S83 and step S84. In step S83, the control unit 150 checks the number of light intensity detecting units 120 of which the output is 1. In step S84, the control unit 150 determines whether the amount of change in the number of light intensity detecting units 120 of which the output is 1 is negative. When it is determined in step S84 that the change in the number of light intensity detecting units 120 of which the output is 1 is negative (in the case of Yes), step S52 is executed.

When it is determined in step S84 that the change in the number of light intensity detecting units 120 of which the output is 1 is not negative (in the case of No), the process proceeds to step S53, and waits for passage of a shadow (here, the flowchart to be executed does not change). Specifically, the process waits for just a predetermined time until a shadow passes over the solar battery cluster. The predetermined time during which a shadow passes may be calculated and obtained from the speed of the automobile or the length of the solar battery module 110 in the traveling direction of the automobile. After a lapse of the predetermined time, the process proceeds to step S85. In step S85, the control unit 150 checks the number of light intensity detecting units 120 of which the output is 1, and proceeds with the process to step S51 or step S52. In step S51 or step S52, the flowchart corresponding to the number of light intensity detecting units 120 of which the output is 1 is executed.

Interrupt control will be further described in detail with reference to FIG. 3A and FIG. 3B. For example, it is assumed that the flowchart 1 shown in FIG. 5 is executed while the start voltage is set for the voltage $V_{3\_1}$ in a state where the number of light intensity detecting units 120 of which the output is 1 is three (step S51 of the flowchart 5). Here, there arises a shadow on the solar battery module 110 as a result of movement of the automobile 500 on which the solar battery module 110 is installed, and, for example, the shadow is placed in a state of $600_1$ in FIG. 3B. In this case, because the output of the light intensity detecting unit $120_1$ changes from 1 to 0, the change in the output becomes a trigger, and step S81 and step S82 of the flowchart 5 are executed.

The control unit 150 is able to learn based on the information from the light intensity detecting units 120 that the number of light intensity detecting units 120 of which the output is 1 is two. Therefore, the control unit 150 determines in step S82 that the amount of change in the number is negative, and proceeds with the process to step S52 of the flowchart 5. In step S52, the start voltage is shifted to the value of the voltage $V_{2\_1}$ of the flowchart 2 shown in FIG. 6, and the flowchart 2 shown in FIG. 6 is executed. In order to shift the start voltage, the control unit 150 just needs to, for example, change the duty ratio of the step-up circuit or step-down circuit (DC-DC converter) of the load controller 300 via the power generation voltage stabilizer 200. A time required to shift the start voltage is, for example, about 1 ms.

Subsequently, when the shadow becomes a state indicated by $600_2$ in FIG. 3B, because the output of the light intensity detecting unit $120_1$ changes from 0 to 1, the change in the output becomes a trigger, and step S83 and step S84 of the flowchart 5 are executed. In the case of FIG. 3B, because the amount of change in the number of light intensity detecting units 120 of which the output is 1 does not become negative, the process proceeds to step S53 of the flowchart 5, and waits for just the predetermined time until the shadow passes over the solar battery cluster. That is, the process waits until the shadow changes from a state indicated by $600_3$ in FIG. 3B to a state indicated by $600_4$ in FIG. 3B.

After a lapse of the predetermined time (the shadow is in the state indicated by $600_4$ in FIG. 3B), the process proceeds to step S85 of the flowchart 5. That is, the control unit 150 is able to learn based on the information from the light intensity detecting units 120 that the number of light intensity detecting units 120 of which the output is 1 is three. Therefore, the control unit 150 proceeds with the process to step S51 of the flowchart 5, and executes the flowchart 1 shown in FIG. 5.

By executing such interrupt control, for example, even when the P-V characteristic curve steeply changes because of the influence of a shadow, the start voltage is shifted to the start voltage that is assumed to be close to the maximum power point and then MPP control is resumed, so it is possible to obtain the maximum power point in a shorter time than that in the related art. That is, it is possible to implement the solar battery controller 100 of which trackability to the maximum output point in the case of a steep change in the amount of solar radiation to the solar battery module 110 is improved as compared to the related art. As a result, it is possible to implement the solar battery controller 100 that is able to suppress a decrease in the power generation efficiency of the solar battery module 110 due to the influence of a shadow.

Figure 6:
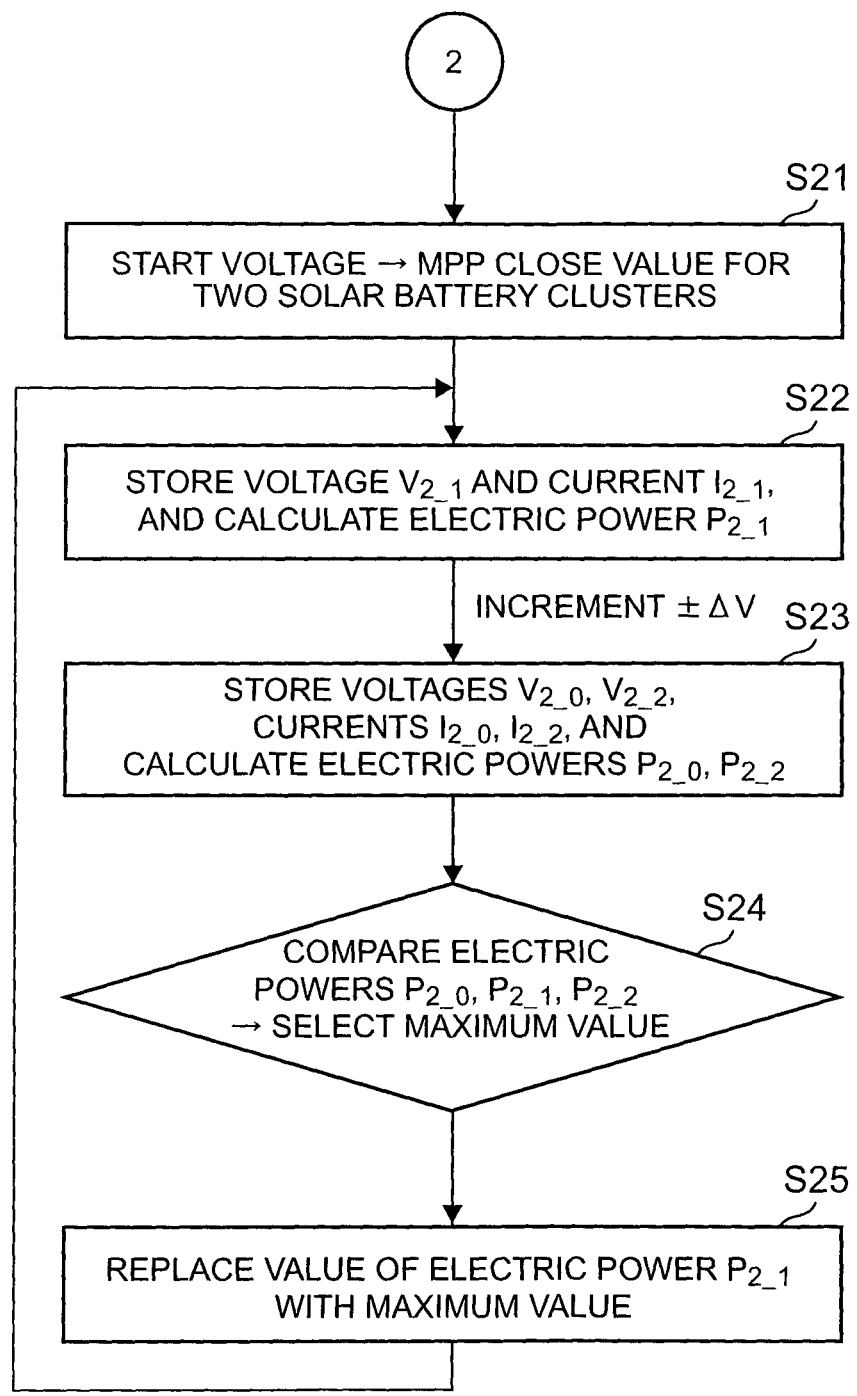
FIG. 6 is an example (part 2) of a flowchart that shows the operation of the control unit.

In the above-described example, an example in which the start voltage is shifted to the start voltage in the flowchart 2 of FIG. 6 while the flowchart 1 of FIG. 5 is being executed is described. Instead, based on the information from the light intensity detecting units 120, while the flowchart 1 of FIG. 1 is being executed, the start voltage may be shifted to the start voltage in the flowchart 3 of FIG. 7 or the state may be shifted to a state where the load controller is in an open state in the flowchart 4 shown in FIG. 8. Similarly, based on the information from the light intensity detecting units 120, while the flowchart 2 of FIG. 6 is being executed, the start voltage may be shifted to the start voltage in the flowchart 1 of FIG. 5, the start voltage in the flowchart 3 of FIG. 7, or the state may be shifted to a state where the load controller is in an open state in the flowchart 4 of FIG. 8.

Figure 7:
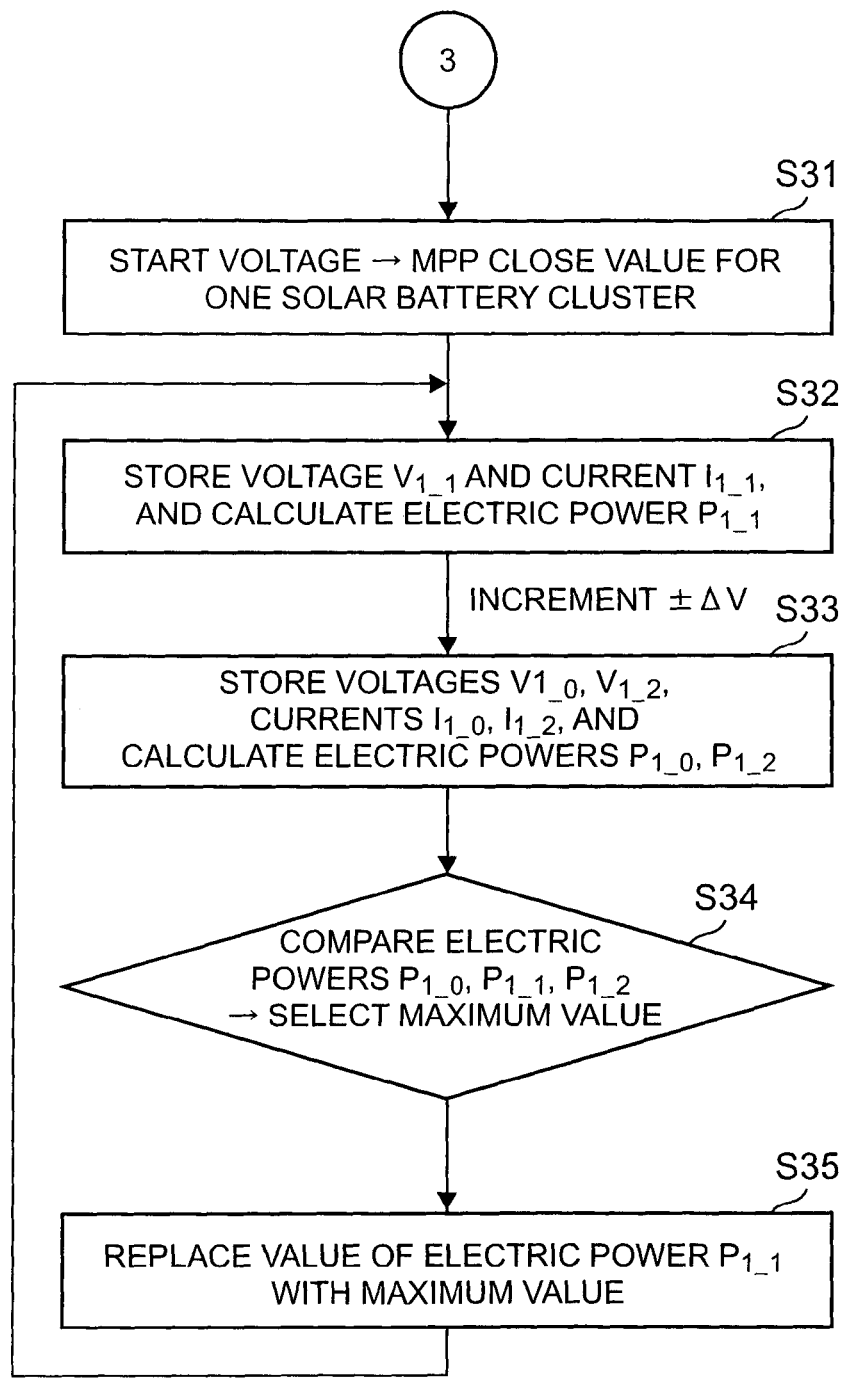
FIG. 7 is an example (part 3) of a flowchart that shows the operation of the control unit.
Figure 8:
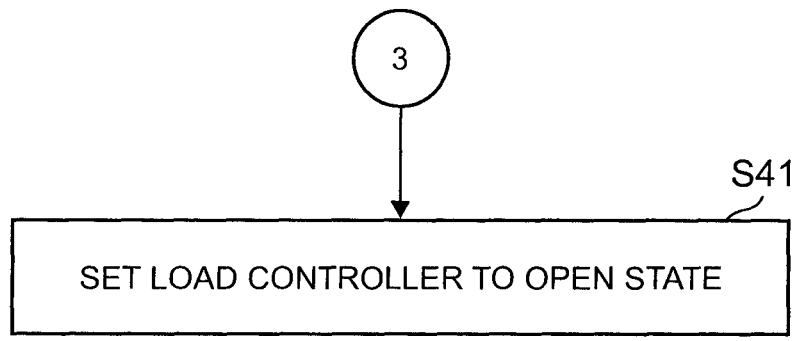
FIG. 8 is an example (part 4) of a flowchart that shows the operation of the control unit.

Based on the information from the light intensity detecting units 120, while the flowchart 3 of FIG. 7 is being executed, the start voltage may be shifted to the start voltage in the flowchart 1 of FIG. 5, the start voltage in the flowchart 2 of FIG. 6, or the state may be shifted to a state where the load controller is in an open state in the flowchart 4 of FIG. 8. Based on the information from the light intensity detecting units 120, the state where the load controller is in an open state in the flowchart 4 of FIG. 8 may be shifted to the start voltage in the flowchart 1 of FIG. 5 or the start voltage in the flowchart 2 of FIG. 6.

Figure 9:
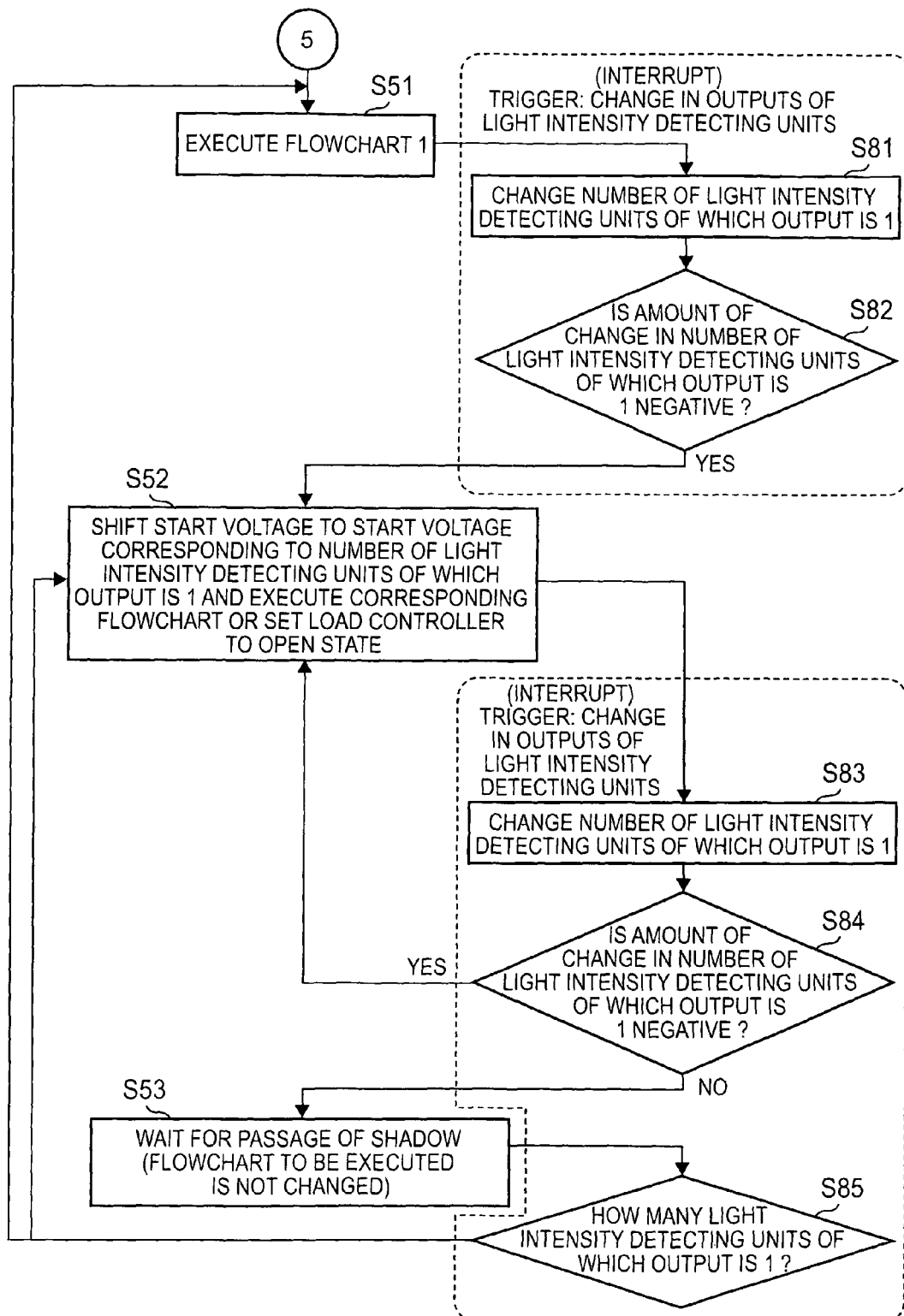
FIG. 9 is an example (part 5) of a flowchart that shows the operation of the control unit.

When the solar battery module includes n solar battery clusters, there are n flowcharts corresponding to FIG. 5 to FIG. 7 and the flowchart of FIG. 8, and the process may proceed to the flowchart corresponding to the information from the light intensity detecting units 120 through interrupt control of FIG. 9.

Second Embodiment

In a second embodiment, an example in which light intensity detecting units are provided behind in the traveling direction of the moving object will be described. In the second embodiment, the description of the same components to those of the above-described embodiment is omitted.

Figure 10:
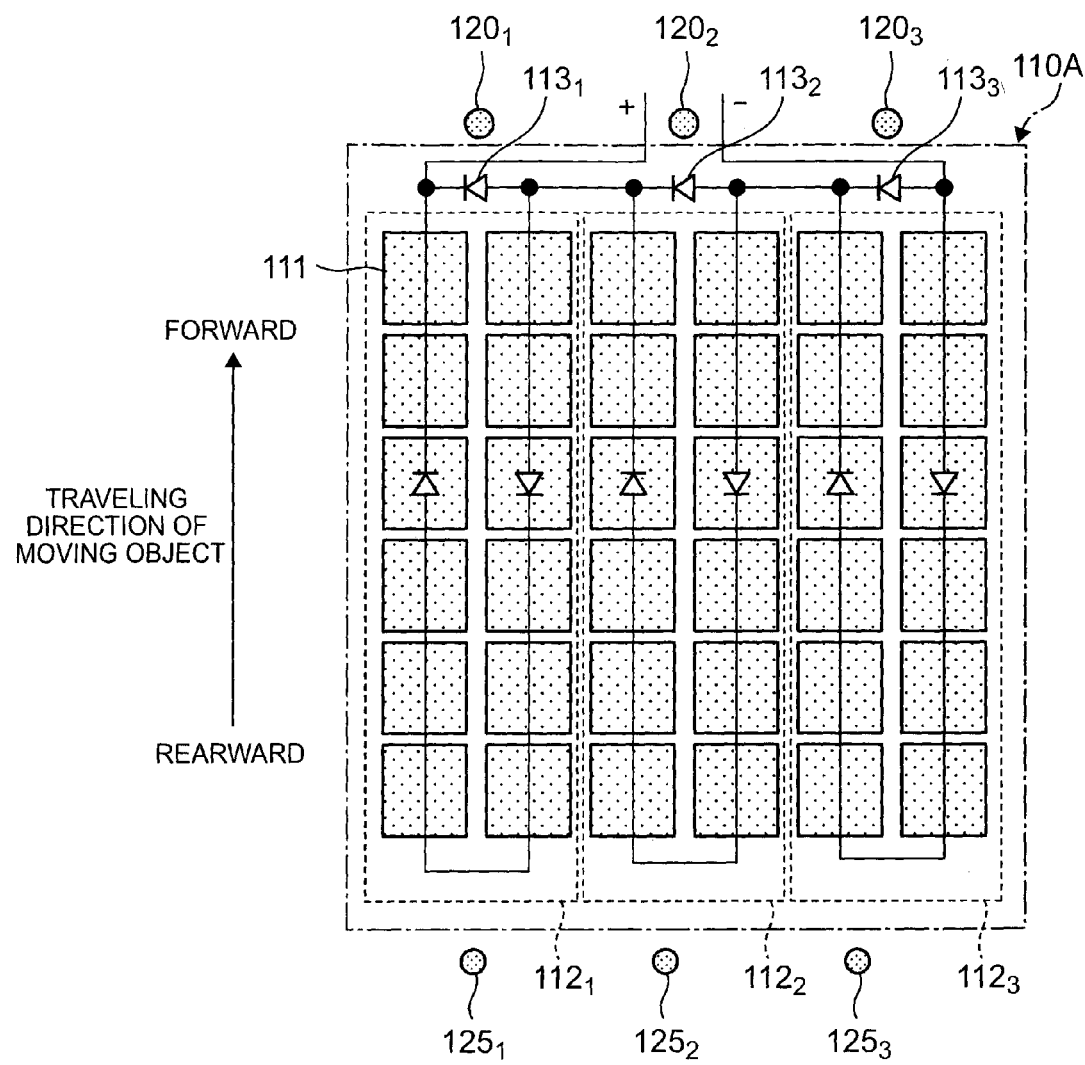
FIG. 10 is a schematic view that illustrates a solar battery module and light intensity detecting units that constitute a solar battery controller according to a second embodiment.

FIG. 10 is a schematic view that illustrates a solar battery module and light intensity detecting units that constitute a solar battery controller according to the second embodiment. Referring to FIG. 10, the solar battery module 110A according to the second embodiment differs from the solar battery module 110 (see FIG. 2) according to the first embodiment in that the light intensity detecting units $125_1$ to $125_3$ are added.

The light intensity detecting unit $125_1$ is arranged behind the solar battery cluster $112_1$ in the traveling direction of the moving object. Similarly, the light intensity detecting unit $125_2$ is arranged behind the solar battery cluster $112_2$ in the traveling direction of the moving object, and the light intensity detecting unit $125_3$ is arranged behind the solar battery cluster $112_3$ in the traveling direction of the moving object. For example, a photodiode, a phototransistor, or the like, may be used as each of the light intensity detecting units $125_1$ to $125_3$. A charge coupled device (CCD) or a solar battery cell (a small piece of solar battery cell) may be used as each of the light intensity detecting units $125_1$ to $125_3$. When the light intensity detecting units $125_1$ to $125_3$ do not particularly need to be distinguished from one another, the light intensity detecting units $125_1$ to $125_3$ may be termed light intensity detecting units 125. Each of the light intensity detecting units 125 is a typical example of a second light intensity detecting unit according to the invention.

By respectively arranging the light intensity detecting units 125 behind the corresponding solar battery clusters 112 in the traveling direction of the moving object, it is possible to detect the light intensity that is applied to each of the solar battery clusters 112. Specifically, it is possible to detect passage of a shadow shading the corresponding solar battery cluster 112 in the traveling direction of the moving object. The light intensities detected by the light intensity detecting units 125 are transmitted to the control unit 150.

Figure 11:
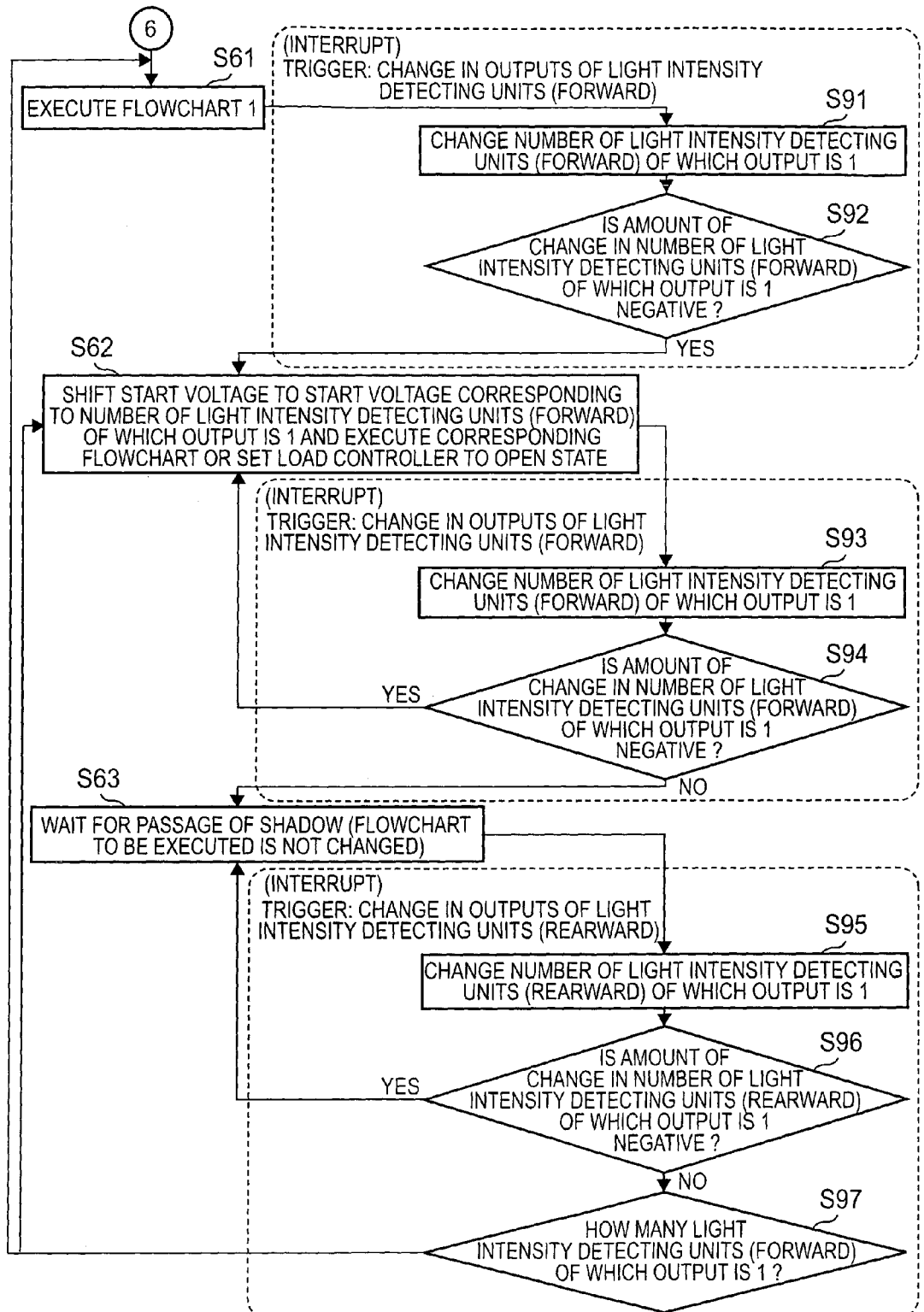
FIG. 11 is an example (part 6) of a flowchart that shows the operation of the control unit.

Next, the flowchart 6 shown in FIG. 11 will be described. The flowchart 6 is a flowchart for interrupt control. The control unit 150 acquires a change in the number of bypassed solar battery clusters 112 based on a change in the outputs of the light intensity detecting units 125, and shifts the start voltage to the start voltage corresponding to the changed number. Hereinafter, specific steps will be described.

In step S61, the control unit 150 executes the flowchart 1 shown in FIG. 5. When the output of any one of the light intensity detecting units 120 arranged ahead in the traveling direction of the moving object changes, the change in the output becomes a trigger of interrupt, and the process proceeds to step S91 and step S92. In step S91, the control unit 150 checks the number of light intensity detecting units 120 of which the output is 1. In step S92, the control unit 150 determines whether the amount of change in the number of light intensity detecting units 120 of which the output is 1 is negative.

When it is determined in step S92 that the change in the number of light intensity detecting units 120 of which the output is 1 is negative (in the case of Yes), the process proceeds to step S62. In step S62, the start voltage is shifted to the start voltage corresponding to the number of light intensity detecting units 120 of which the output is 1 (the changed number), and the corresponding flowchart (any one of the flowcharts 1 to 3) is executed. However, when the number of light intensity detecting units 120 of which the output is 1 is zero, the flowchart 4 is executed, and a command to set the load controller 300 to an open state is output.

When the output of any one of the light intensity detecting units 120 arranged ahead in the traveling direction of the moving object changes, the change in the output becomes a trigger of interrupt, and the process proceeds to step S93 and step S94. In step S93, the control unit 150 checks the number of light intensity detecting units 120 of which the output is 1. In step S94, the control unit 150 determines whether the amount of change in the number of light intensity detecting units 120 of which the output is 1 is negative. When it is determined in step S94 that the change in the number of light intensity detecting units 120 of which the output is 1 is negative (in the case of Yes), step S62 is executed.

When it is determined in step S94 that the change in the number of light intensity detecting units 120 of which the output is 1 is not negative (in the case of No), the process proceeds to step S63, and waits for passage of a shadow (here, the flowchart to be executed does not change).

When the output of any one of the light intensity detecting units 125 arranged behind in the traveling direction of the moving object changes, the change in the output becomes a trigger of interrupt, and the process proceeds to step S95 and step S96. In step S95, the control unit 150 checks the number of light intensity detecting units 125 of which the output is 1. In step S96, the control unit 150 determines whether the amount of change in the number of light intensity detecting units 125 of which the output is 1 is negative. When it is determined in step S96 that the change in the number of light intensity detecting units 125 of which the output is 1 is negative (in the case of Yes), step S63 is executed.

When it is determined in step S96 that the change in the number of light intensity detecting units 125 of which the output is 1 is not negative (in the case of No), the process proceeds to step S97. In step S97, the control unit 150 checks the number of light intensity detecting units 120 (light intensity detecting units arranged ahead in the traveling direction of the moving object) of which the output is 1, and proceeds with the process to step S61 or step S62. In step S61 or step S62, the control unit 150 executes the flowchart corresponding to the number of light intensity detecting units 120 of which the output is 1. A state where the output of the light intensity detecting unit 125 changes from 1 to 0 and then changes from 0 to 1 means that the light intensity detecting unit 125 is shaded by a shadow and then the shadow has passed through the location of the light intensity detecting unit 125.

Figure 12:
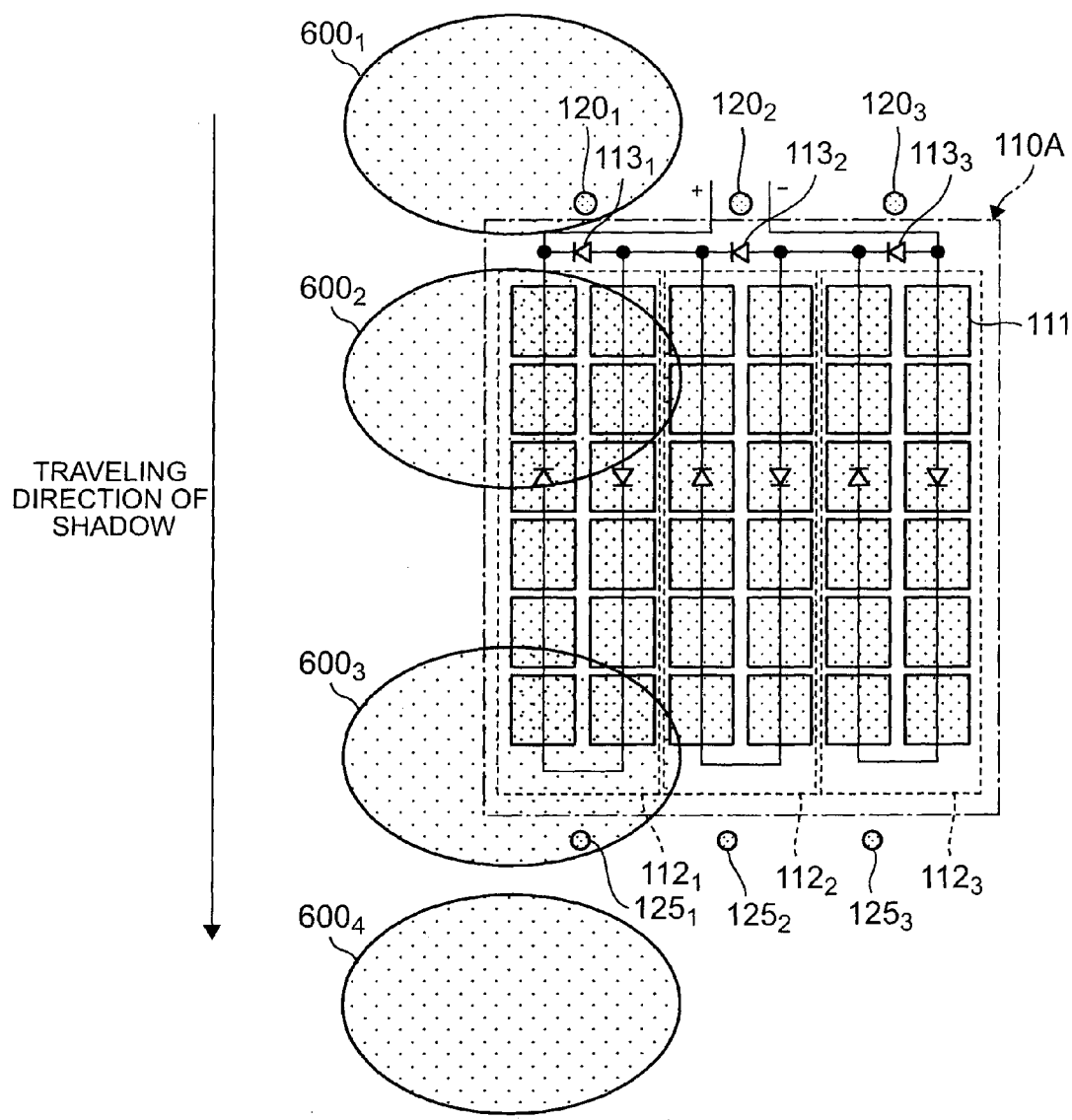
FIG. 12 is a view that illustrates a manner in which a shadow passes over part of the solar battery module installed on an automobile.

Interrupt control will be further described in detail with reference to FIG. 12. For example, it is assumed that the flowchart 1 shown in FIG. 5 is executed while the start voltage is set for the voltage $V_{3\_1}$ in a state where the number of light intensity detecting units 120 of which the output is 1 is three (step S61 of the flowchart 6). Here, there arises a shadow on the solar battery module 110A as a result of movement of the automobile 500 on which the solar battery module 110A is installed, and, for example, the shadow is placed in a state indicated by $600_1$ in FIG. 12. In this case, the output of the light intensity detecting unit $120_1$ arranged ahead in the traveling direction of the moving object changes from 1 to 0, the change in the output becomes a trigger, and step S91 and step S92 of the flowchart 6 are executed.

The control unit 150 is able to learn based on the information from the light intensity detecting units 120 that the number of light intensity detecting units 120 of which the output is 1 is two. Therefore, the control unit 150 determines in step S92 that the amount of change in the number is negative, and proceeds with the process to step S62 of the flowchart 6. In step S62, the start voltage is shifted to the value of the voltage $V_{2\_1}$ of the flowchart 2 shown in FIG. 6, and the flowchart 2 shown in FIG. 6 is executed. A method, or the like, of shifting the start voltage is as described above.

Subsequently, when the shadow becomes a state indicated by $600_2$ in FIG. 12, because the output of the light intensity detecting unit $120_1$ arranged ahead in the traveling direction of the moving object changes from 0 to 1, the change in the output becomes a trigger, and step S93 and step S94 of the flowchart 6 are executed. In the case of FIG. 12, because the amount of change in the number of light intensity detecting units 120 of which the output is 1 does not become negative, the process proceeds to step S63 of the flowchart 5, and waits until the shadow passes over the solar battery cluster.

Subsequently, when the shadow becomes a state indicated by $600_3$ in FIG. 12, because the output of the light intensity detecting unit $125_1$ arranged behind in the traveling direction of the moving object changes from 1 to 0, the change in the output becomes a trigger, and step S95 and step S96 of the flowchart 6 are executed. Because the output of the light intensity detecting unit $125_1$ is 0 until the shadow indicated by $600_3$ passes over the light intensity detecting unit $125_1$, it is determined in step S96 that the amount of change in the number is negative, the process proceeds to step S63, and a state of waiting for passage of the shadow continues.

Subsequently, when the shadow becomes a state indicated by $600_4$ in FIG. 12, because the output of the light intensity detecting unit $125_1$ arranged behind in the traveling direction of the moving object changes from 0 to 1, the change in the output becomes a trigger, and step S95 and step S96 of the flowchart 6 are executed again. Because the output of the light intensity detecting unit $125_1$ is 1, it is determined in step S96 that the amount of change in the number is not negative, and the process proceeds to step S97 of the flowchart 6.

That is, the control unit 150 acquires that the shadow shading the solar battery cluster 112 has passed rearward in the traveling direction of the moving object (acquires that the number of light intensity detecting units of which the output is 1 is three), the process proceeds to step S61 of the flowchart 6, and the flowchart 1 shown in FIG. 5 is executed.

By executing such interrupt control, as in the case of the first embodiment, for example, even when the P-V characteristic curve steeply changes because of the influence of a shadow, the start voltage is shifted to the start voltage that is assumed to be close to the maximum power point and then MPP control is resumed, so it is possible to obtain the maximum power point in a shorter time than that in the related art. As a result, it is possible to suppress a decrease in the power generation efficiency of the solar battery module 110 due to the influence of a shadow.

Different from the first embodiment, by respectively arranging the light intensity detecting units 125 behind the corresponding solar battery clusters 112 in the traveling direction of the moving object, the control unit 150 is able to acquire the fact that a shadow shading the solar battery cluster 112 has passed rearward in the traveling direction of the moving object, so it is possible to shift the start voltage at further accurate timing.

Alternative Embodiment to Second Embodiment

In the second embodiment, an example in which the light intensity detecting units are arranged one by one ahead of and behind each of the solar battery clusters is described. In an alternative embodiment to the second embodiment, an example in which a solar battery module includes solar battery clusters and a plurality of light intensity detecting units are provided two by two ahead of and behind each of the solar battery clusters is described. In the alternative embodiment to the second embodiment, the description of the same components to those of the above-described embodiments is omitted.

Figure 13:
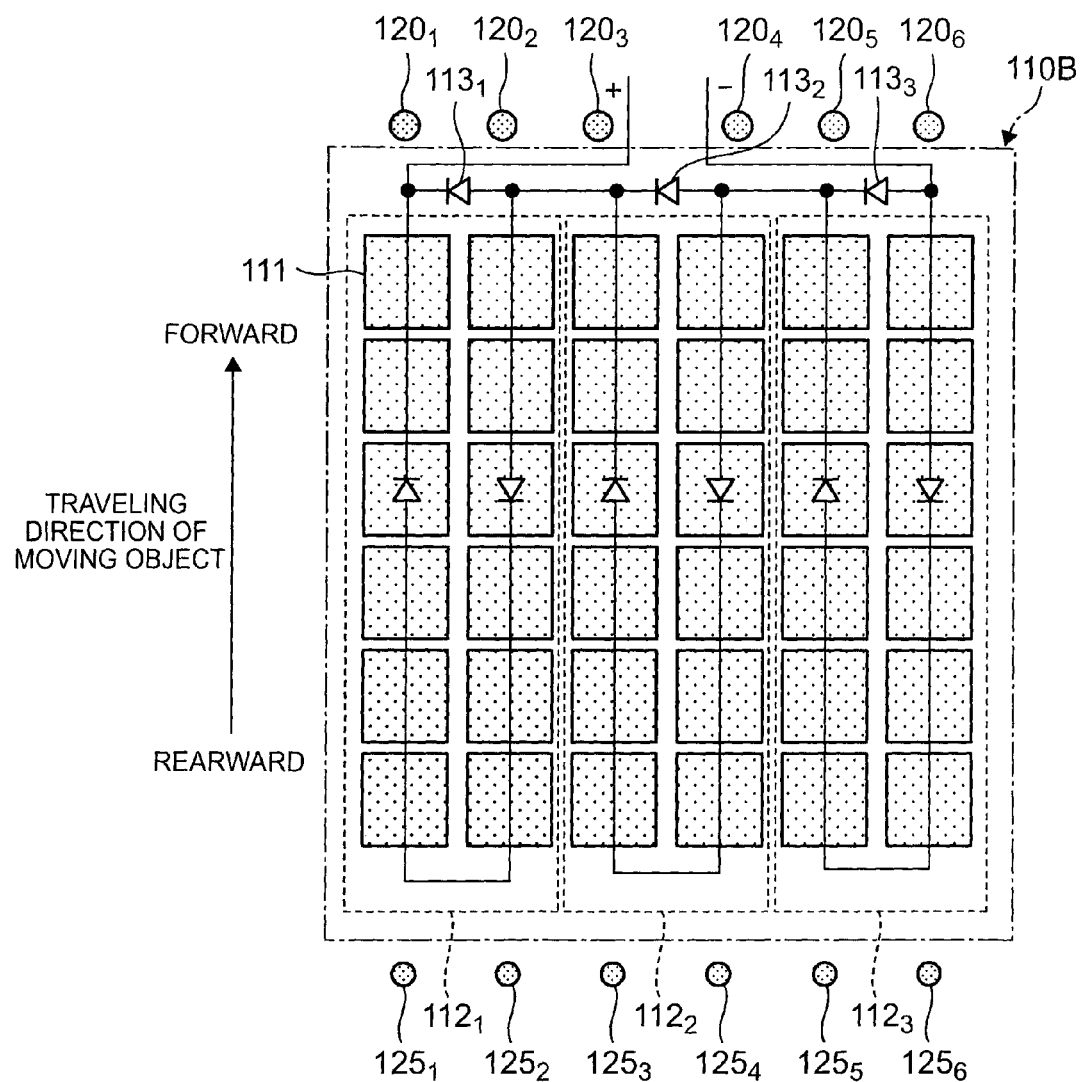
FIG. 13 is a schematic view (part 1) that illustrates a solar battery module and light intensity detecting units that constitute a solar battery controller according to an alternative embodiment to the second embodiment.

FIG. 13 is a schematic view that illustrates a solar battery module and light intensity detecting units that constitute a solar battery controller according to the alternative embodiment to the second embodiment. Referring to FIG. 13, the solar battery module 110B according to the alternative embodiment to the second embodiment differs from the solar battery module 110A (see FIG. 10) according to the second embodiment in that the light intensity detecting units $120_4$ to $120_6$, $125_4$ to $125_6$ are added.

The light intensity detecting unit $120_1$ is arranged ahead of the first column of the solar battery cluster $112_1$ in the traveling direction of the moving object, and the light intensity detecting unit $125_1$ is arranged behind the first column of the solar battery cluster $112_1$ in the traveling direction of the moving object. The light intensity detecting unit $120_2$ is arranged ahead of the second column of the solar battery cluster $112_1$ in the traveling direction of the moving object, and the light intensity detecting unit $125_2$ is arranged behind the second column of the solar battery cluster $112_1$ in the traveling direction of the moving object.

Similarly, the light intensity detecting unit $120_3$ is arranged ahead of the first column of the solar battery cluster $112_2$ in the traveling direction of the moving object, and the light intensity detecting unit $125_3$ is arranged behind the first column of the solar battery cluster $112_2$ in the traveling direction of the moving object. The light intensity detecting unit $120_4$ is arranged ahead of the second column of the solar battery cluster $112_2$ in the traveling direction of the moving object, and the light intensity detecting unit $125_4$ is arranged behind the second column of the solar battery cluster $112_2$ in the traveling direction of the moving object.

Similarly, the light intensity detecting unit $120_5$ is arranged ahead of the first column of the solar battery cluster $112_3$ in the traveling direction of the moving object, and the light intensity detecting unit $125_5$ is arranged behind the first column of the solar battery cluster $112_3$ in the traveling direction of the moving object. The light intensity detecting unit $120_6$ is arranged ahead of the second column of the solar battery cluster $112_3$ in the traveling direction of the moving object, and the light intensity detecting unit $125_6$ is arranged behind the second column of the solar battery cluster $112_3$ in the traveling direction of the moving object.

By arranging the light intensity detecting unit 120 ahead of each column of each of the solar battery clusters 112 in the traveling direction of the moving object, it is possible to detect entry of a shadow shading the corresponding solar battery cluster 112 in the traveling direction of the moving object column by column, so it is possible to improve the accuracy of detecting a shadow. In addition, by arranging the light intensity detecting unit 125 behind each column of each of the solar battery clusters 112 in the traveling direction of the moving object, it is possible to detect passage of a shadow shading the corresponding solar battery cluster 112 in the traveling direction of the moving object column by column, so it is possible to improve the accuracy of detecting a shadow.

In this way, the accuracy of detecting a shadow may be improved by arranging the pair of light intensity detecting units 120, 125 for each column of each of the solar battery clusters 112. The accuracy of detecting a shadow may be further improved by arranging the multiple pairs of light intensity detecting units 120, 125 for each column of each of the solar battery clusters 112.

Figure 14:
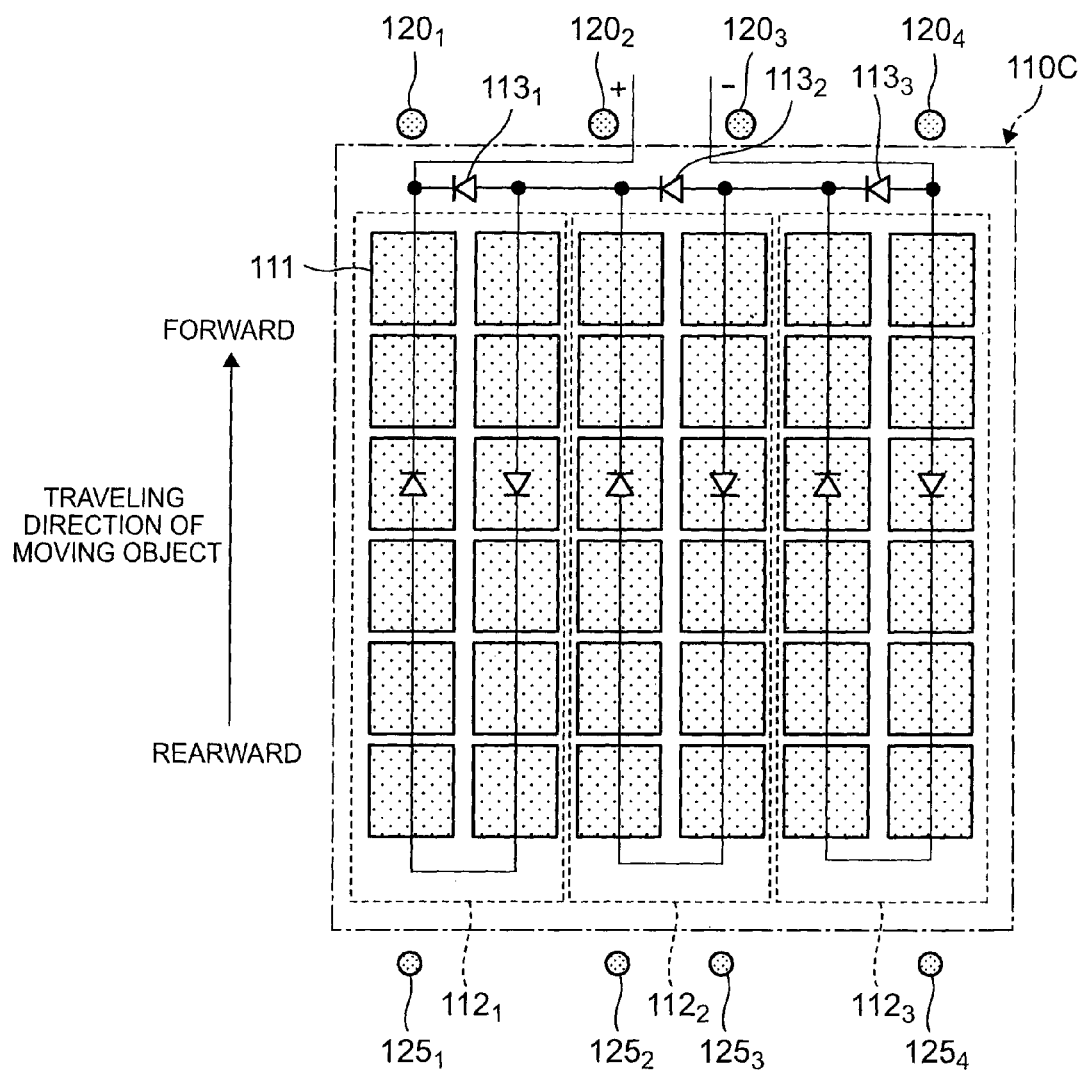
FIG. 14 is a schematic view (part 2) that illustrates a solar battery module and light intensity detecting units that constitute a solar battery controller according to an alternative embodiment to the second embodiment.

In all the solar battery clusters 112, not the pair of light intensity detecting units 120, 125 are arranged column by column but, as shown in FIG. 14, the pair of light intensity detecting units 120, 125 may be arranged column by column for a specified one of the solar battery clusters 112. It is effective in the case where there is a space in which only one pair of light intensity detecting units 120, 125 are allowed to be arranged physically for each of the solar battery clusters 112.

The accuracy of detecting a shadow may be improved by arranging only the light intensity detecting unit 120 for each column of each of the solar battery clusters 112. That is, as in the case of the first embodiment, the light intensity detecting unit may not be provided behind in the traveling direction of the moving object.

The embodiments and the alternative embodiments are described in detail above; however, the invention is not limited to the above-described embodiments or alternative embodiments. The above-described embodiments and alternative embodiments may be variously modified or replaced without departing from the scope of the appended claims.

The invention claimed is:

1. A solar battery controller comprising:
a solar battery module including a plurality of solar battery clusters and a bypass portion, the plurality of solar battery clusters being arranged side by side in a direction that intersects with a traveling direction of a moving object, the plurality of solar battery clusters being connected in series, the bypass portion being configured to bypass the solar battery cluster to which a light intensity applied has decreased;
a first light intensity detecting unit configured to detect a light intensity that is applied to a corresponding one of the solar battery clusters, the first light intensity detecting unit being arranged ahead of the corresponding one of the solar battery clusters in the traveling direction of the moving object; and
a control unit configured to determine a maximum power point of the solar battery module, wherein
the control unit is configured to acquire a change in the number of bypassed solar battery clusters based on a change in an output of each first light intensity detecting unit, the control unit is configured to shift a start voltage to a first start voltage corresponding to the changed number of bypassed solar battery clusters, and the control unit is configured to determine the maximum power point of the solar battery module by calculating an electric power while changing a voltage from the first start voltage.

2. The solar battery controller according to claim 1, further comprising:
a second light intensity detecting unit configured to detect a light intensity that is applied to a corresponding one of the solar battery clusters, the second light intensity detecting unit being arranged behind the corresponding one of the solar battery clusters in the travel direction of the moving object, wherein
when at least one of the first light intensity detecting units has detected a reduction in the light intensity applied to a corresponding one of the solar battery clusters and then the at least one of the first light intensity detecting unit has detected an increase in the light intensity applied to the corresponding one of the solar battery clusters and, in addition, at least one of the second light intensity detecting units has detected a reduction in the light intensity applied to the corresponding one of the solar battery clusters and then the at least one of the second light intensity detecting units has detected an increase in the light intensity applied to the corresponding one of the solar battery clusters, the control unit is configured to acquire a change in the number of non-bypassed solar battery clusters based on a change in an output of each second light intensity detecting unit, shift the start voltage to a second start voltage corresponding to the number, and determine the maximum power point of the solar battery module by calculating an electric power while changing a voltage from the second start voltage.

3. The solar battery controller according to claim 1, further comprising:
a load controller configured to control a load of the solar battery module, wherein
the load controller is configured to be connectable to the solar battery module, the control unit is configured to output a command to open the load controller when the control unit has acquired the fact that all the solar battery clusters are bypassed based on the output of each first light intensity detecting unit.

4. The solar battery controller according to claim 2, further comprising:
a load controller configured to control a load of the solar battery module, wherein
the load controller is configured to be connectable to the solar battery module, the control unit is configured to output a command to open the load controller when the control unit has acquired the fact that all the solar battery clusters are bypassed based on the output of each first light intensity detecting unit or the output of each second light intensity detecting unit.

5. The solar battery controller according to claim 1, wherein
the control unit is configured to prestore a plurality of the first start voltages corresponding to the number of non-bypassed solar battery clusters.

6. The solar battery controller according to claim 2, wherein
the control unit is configured to prestore a plurality of the first start voltages corresponding to the number of non-bypassed solar battery clusters or a plurality of the second start voltages corresponding to the number of non-bypassed solar battery clusters.

7. The solar battery controller according to claim 1, wherein
   a plurality of the first light intensity detecting units are provided in correspondence with each solar battery cluster.

8. The solar battery controller according to claim 2, wherein
   a plurality of the first light intensity detecting units or a plurality of the second light intensity detecting units are provided in correspondence with each solar battery cluster.

9. The solar battery controller according to claim 1, wherein
   the first light intensity detecting unit is provided such that the output of the first light intensity detecting unit changes according to a movement of the moving object.

10. The solar battery controller according to claim 2, wherein
    the second light intensity detecting unit is provided such that the output of the second light intensity detecting unit changes according to a movement of the moving object.

\* \* \* \* \*